United States Patent
Olesiewicz et al.

(10) Patent No.: US 8,089,770 B2
(45) Date of Patent: Jan. 3, 2012

(54) TOOL-LESS MULTI-STAGE INSERTION AND SECURING MECHANISM FOR ELECTRONIC MEZZANINE ASSEMBLIES

(75) Inventors: Timothy W. Olesiewicz, Santa Clara, CA (US); Patrick T. Conlon, Burlington, MA (US); Brett C. Ong, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 739 days.

(21) Appl. No.: 12/187,212

(22) Filed: Aug. 6, 2008

(65) Prior Publication Data
US 2010/0033924 A1   Feb. 11, 2010

(51) Int. Cl.
H05K 5/00  (2006.01)
H05K 7/00  (2006.01)
H05K 1/11  (2006.01)
H05K 1/14  (2006.01)

(52) U.S. Cl. ......... 361/752; 361/760; 361/785; 361/790

(58) Field of Classification Search .......... 361/724–727, 361/729, 752, 760, 784, 785, 790, 792, 796, 361/798, 802
See application file for complete search history.

(56) References Cited

U.S. PATENT DOCUMENTS

| | | | |
|---|---|---|---|
| 5,162,979 A * | 11/1992 | Anzelone et al. | 361/679.32 |
| 5,481,431 A * | 1/1996 | Siahpolo et al. | 361/679.31 |
| 5,530,620 A * | 6/1996 | Sangveraphunsiri | 361/679.33 |
| 5,831,821 A * | 11/1998 | Scholder et al. | 361/679.32 |
| 6,025,989 A * | 2/2000 | Ayd et al. | 361/695 |
| 6,056,579 A * | 5/2000 | Richards et al. | 439/358 |
| 6,118,668 A * | 9/2000 | Scholder et al. | 361/753 |
| 6,567,271 B2 * | 5/2003 | Stone et al. | 361/724 |
| 6,711,023 B2 * | 3/2004 | Yen | 361/740 |
| 6,778,408 B2 * | 8/2004 | Yang | 361/796 |
| 6,819,567 B2 * | 11/2004 | Baker et al. | 361/724 |
| 6,853,556 B1 * | 2/2005 | Myers et al. | 361/754 |
| 7,272,001 B2 * | 9/2007 | Cheng | 361/679.48 |
| 7,283,371 B1 * | 10/2007 | Grouell et al. | 361/741 |
| 7,630,212 B2 * | 12/2009 | Fan et al. | 361/798 |
| 7,649,751 B2 * | 1/2010 | Nguyen et al. | 361/802 |
| 7,686,619 B2 * | 3/2010 | Bell et al. | 439/65 |
| 7,746,654 B2 * | 6/2010 | Franz et al. | 361/724 |
| 7,771,218 B2 * | 8/2010 | Jaramillo et al. | 439/157 |
| 2002/0122296 A1 * | 9/2002 | Stone et al. | 361/687 |
| 2003/0107880 A1 * | 6/2003 | Yang | 361/796 |
| 2004/0106318 A1 * | 6/2004 | Westphall et al. | 439/325 |
| 2006/0221581 A1 * | 10/2006 | DeNies et al. | 361/740 |
| 2007/0076369 A1 * | 4/2007 | Chen et al. | 361/687 |
| 2007/0086172 A1 * | 4/2007 | Lai et al. | 361/727 |

(Continued)

*Primary Examiner* — Jinhee Lee
*Assistant Examiner* — Adrian S Wilson
(74) *Attorney, Agent, or Firm* — Osha • Liang LLP

(57) ABSTRACT

A multi-stage mezzanine board mounting assembly within a computer chassis includes a mezzanine tray and mezzanine mounting brackets. The mezzanine tray includes a clamping mechanism. The mezzanine mounting brackets are disposed within the computer chassis and configured to engage with the mezzanine tray when the mezzanine tray is mounted thereon. The clamping mechanism is configured to clamp the mezzanine tray against the mezzanine mounting brackets such that the mezzanine tray is locked in place on the mezzanine mounting brackets. A method of installing a mezzanine board includes disposing mezzanine mounting brackets within a computer chassis; mounting a mezzanine tray onto the mezzanine mounting brackets such that insertion alignment members of the mezzanine tray engage with an engaging portion of the mezzanine mounting brackets; rotating rotatable clamping levers such that the mezzanine tray is locked in place on the mezzanine mounting brackets when the rotatable clamping levers are fully engaged.

13 Claims, 7 Drawing Sheets

U.S. PATENT DOCUMENTS

| | | |
|---|---|---|
| 2007/0217143 A1* | 9/2007 | Wagatsuma et al. .......... 361/685 |
| 2007/0247826 A1* | 10/2007 | Grady et al. ................. 361/796 |
| 2007/0279884 A1* | 12/2007 | Hardt et al. .................. 361/796 |
| 2008/0019104 A1* | 1/2008 | Karstens ...................... 361/732 |
| 2008/0043405 A1* | 2/2008 | Lee et al. ..................... 361/600 |
| 2008/0055876 A1* | 3/2008 | Fan et al. ..................... 361/801 |
| 2008/0253076 A1* | 10/2008 | Chen ............................ 361/684 |
| 2008/0293265 A1* | 11/2008 | Nguyen et al. ................. 439/74 |
| 2008/0304223 A1* | 12/2008 | Franz et al. ................... 361/683 |
| 2009/0225527 A1* | 9/2009 | Olesiewicz et al. ........... 361/802 |

* cited by examiner

TOOL-LESS MULTI-STAGE INSERTION AND SECURING MECHANISM FOR ELECTRONIC MEZZANINE ASSEMBLIES

BACKGROUND OF INVENTION

1. Field of the Invention

The invention relates generally to a mezzanine board mounting assembly for mounting a mezzanine board in a computer chassis.

2. Background Art

A mezzanine board is a printed circuit board (PCB) used as an extension of a base PCB, e.g., a motherboard. The mezzanine board plugs into and extends the circuitry of the base PCB. Mezzanine boards are an important element in the design of today's high-density computer servers, as they expand the basic functionality of the base PCB and enable higher computational and memory densities.

Mezzanine assemblies are typically used to mount the mezzanine boards onto the base PCB. Mechanical considerations that go into the installation process include proper mounting, securing, and aligning of the mezzanine assembly. When mounting the mezzanine board onto the base PCB, precise alignment of the mezzanine assembly is required to connect high-density connectors of the mezzanine board to the base PCB. Further, due to the weight of the mezzanine board, a significant retention force is required to secure the mezzanine assembly rigidly.

SUMMARY OF INVENTION

In general, in one aspect, the invention relates to a multi-stage mezzanine board mounting assembly within a computer chassis, comprising: a mezzanine tray comprising a clamping mechanism; and mezzanine mounting brackets disposed within the computer chassis and configured to engage with the mezzanine tray when the mezzanine tray is mounted thereon, wherein the clamping mechanism is configured to clamp the mezzanine tray against the mezzanine mounting brackets such that the mezzanine tray is locked in place on the mezzanine mounting brackets.

In general, in one aspect, the invention relates to a multi-stage mezzanine board mounting assembly within a computer chassis, comprising: a mezzanine tray comprising: a pair of rotatable clamping levers, each comprising cam portions attached to opposing side walls of the mezzanine tray and a handle portion connecting the cam portions; and an insertion alignment member disposed on each of the opposing side walls of the mezzanine tray between the cam portions of the rotatable clamping levers; and mezzanine mounting brackets disposed within the computer chassis, comprising: engaging portions configured to engage with the insertion alignment members when the mezzanine tray is mounted thereon; clamping portions configured to be clamped by the cam portions of the mezzanine tray; and elastomer inserts disposed at an interface between the clamping portions of the mezzanine mounting brackets and the cam portions of the rotatable clamping levers, wherein the cam portions of the rotatable clamping levers are configured to clamp the elastomer inserts against the clamping portions of the mezzanine mounting brackets such that the mezzanine tray is locked in place on the mezzanine mounting brackets when the rotatable clamping levers are fully engaged.

In general, in one aspect, the invention relates to a method of installing a mezzanine board onto a base circuit board within a computer chassis, the method comprising: disposing mezzanine mounting brackets within the computer chassis; mounting a mezzanine tray onto the mezzanine mounting brackets such that insertion alignment members of the mezzanine tray engage with an engaging portion of the mezzanine mounting brackets; rotating rotatable clamping levers such that the mezzanine tray is locked in place on the mezzanine mounting brackets when the rotatable clamping levers are fully engaged.

Other aspects and advantages of the invention will be apparent from the following description and the appended claims.

DETAILED DESCRIPTION

Specific embodiments of the invention will be described with reference to the accompanying figures. Like items in the figures are shown with the same reference numbers.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

One or more embodiments of the present invention provide a multi-stage inserting and securing mechanisms for a mezzanine mounting board assembly. The mezzanine mounting board assembly according to one or more embodiments of the present invention includes mezzanine mounting brackets disposed within a computer chassis and a removable mezzanine tray configured to mount in the mezzanine mounting brackets. The mezzanine tray and the mounting brackets work together to provide a multi-stage mezzanine mounting architecture for mounting and securing a mezzanine board onto a base printed circuit board ("PCB").

Figure 1:
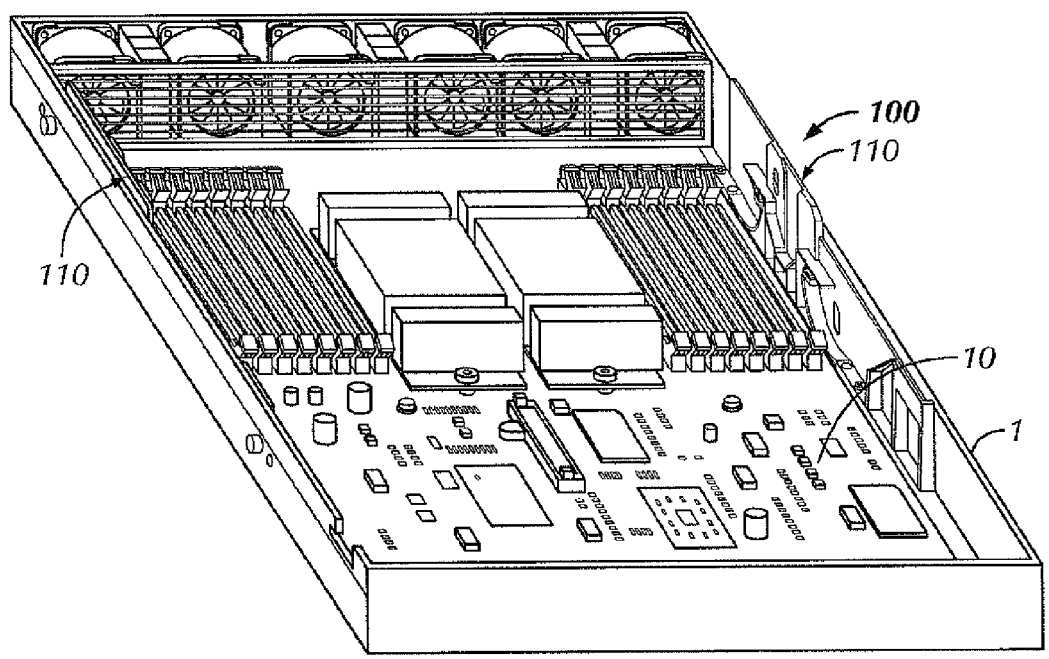
FIG. 1 shows a side perspective view of mezzanine mounting brackets of a multi-stage mezzanine board mounting assembly according to one or more embodiments of the present invention.
Figure 2:
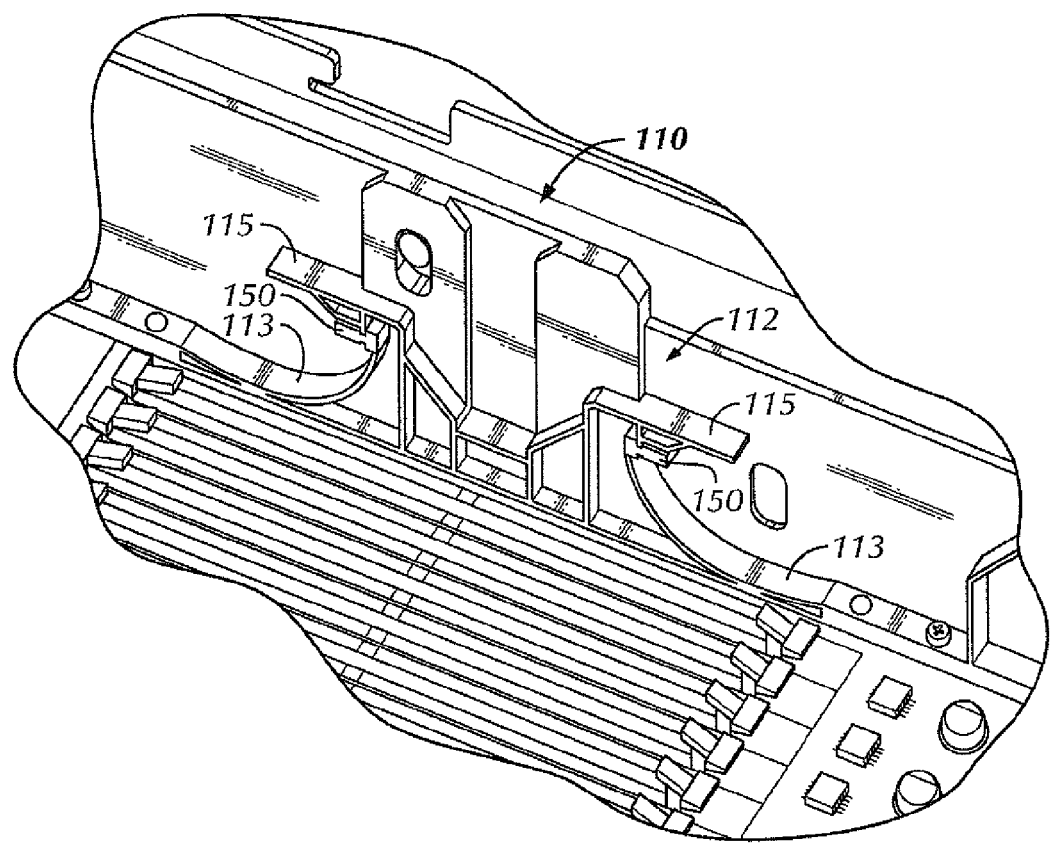
FIG. 2 shows a close-up view of one of the mezzanine mounting brackets shown in FIG. 1.
Figure 3:
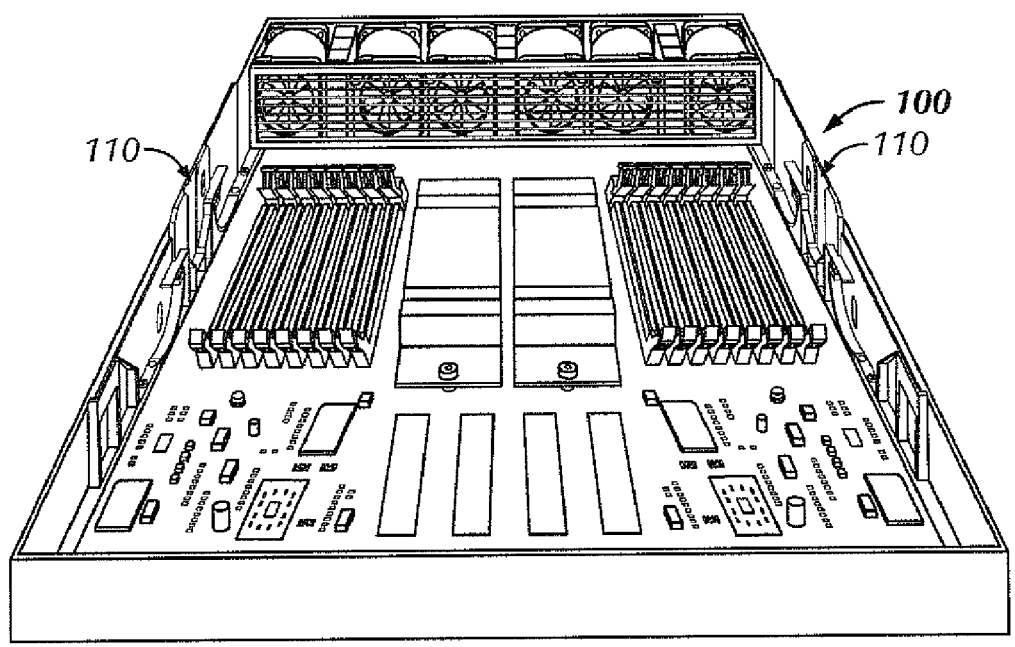
FIG. 3 shows a top perspective view of the mezzanine mounting brackets of FIG. 1.

FIGS. 1-3 show a mezzanine mounting brackets 110 (hereinafter referred to as mounting brackets 110) according to one or more embodiments of the present invention. As can be seen in FIGS. 1 and 3, the mounting brackets 110 may be disposed on side walls of a computer chassis 1, so that a base PCB can be disposed therebetween. The mounting brackets 110 are connected to the chassis, for example, using screws. Those skilled in the art will appreciate many other attachment mechanisms that could be used to connect the brackets to the chassis, for example, clips, hooks, rivets, adhesives, etc.

FIG. 2 shows a close-up view of one of the mounting brackets 110. Each of the mounting brackets 110 includes an engaging portion 112 and clamping portions 113. Each of the mounting brackets 110 also includes elastic members disposed at an interface between the mounting brackets 110 and the clamping mechanism, e.g., elastomer inserts 150 disposed at an interface between the clamping portions 113 and the cam portions 122b of the rotatable clamping levers 122. These elastomer inserts compress upon engagement of the mezzanine tray (described below) and lock the tray into place more securely.

Figure 4:
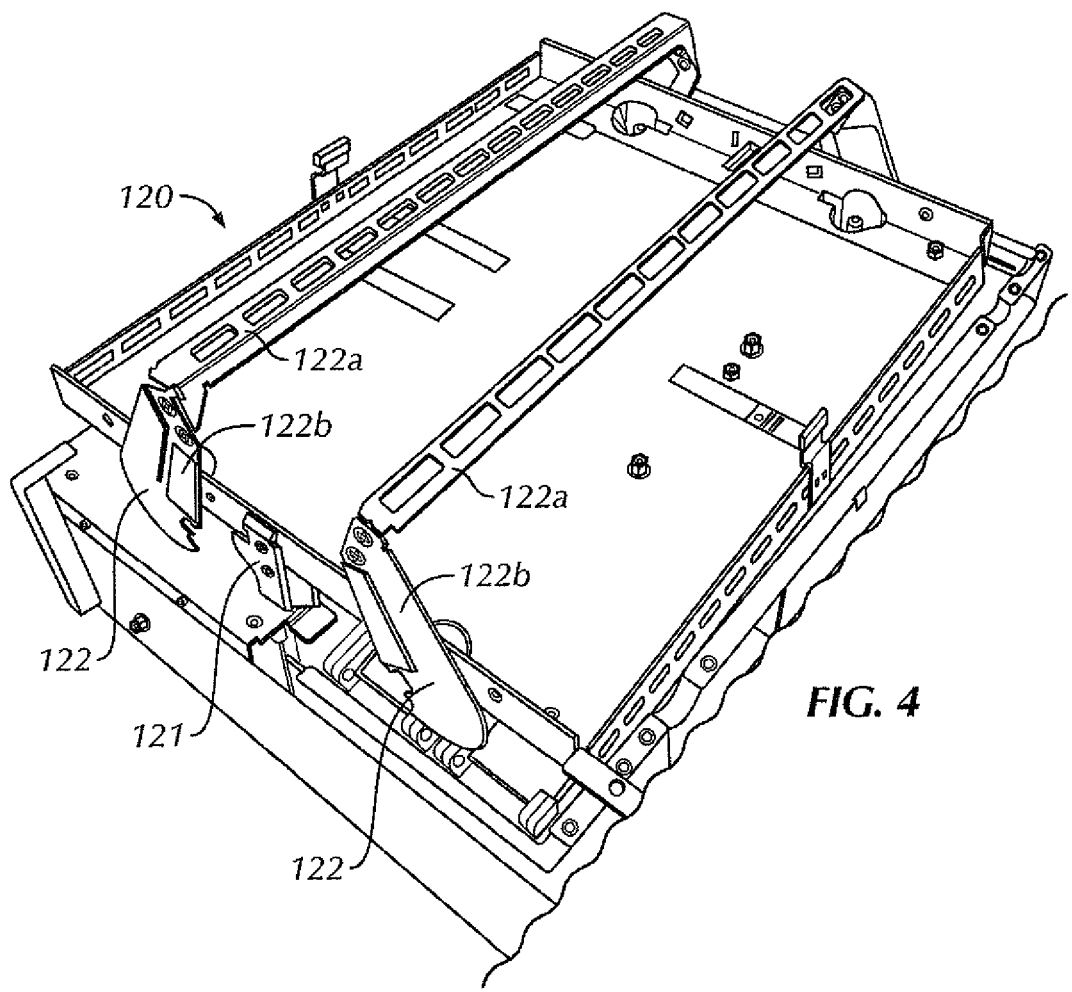
FIG. 4 shows a side perspective view of a mezzanine tray of the multi-stage mezzanine board mounting assembly according to one or more embodiments of the present invention.
Figure 5:
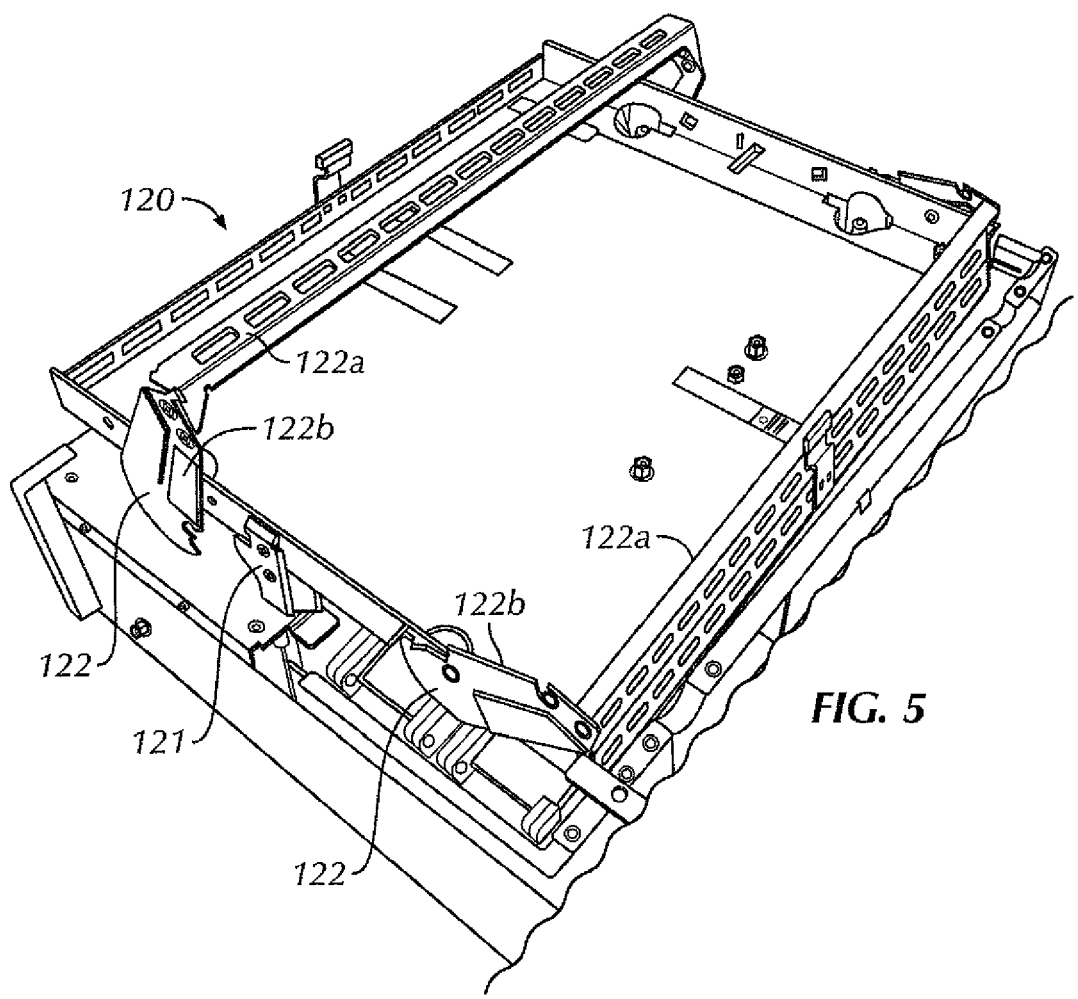
FIG. 5 shows a side perspective view of the mezzanine tray of FIG. 4 in a closed position.
Figure 6:
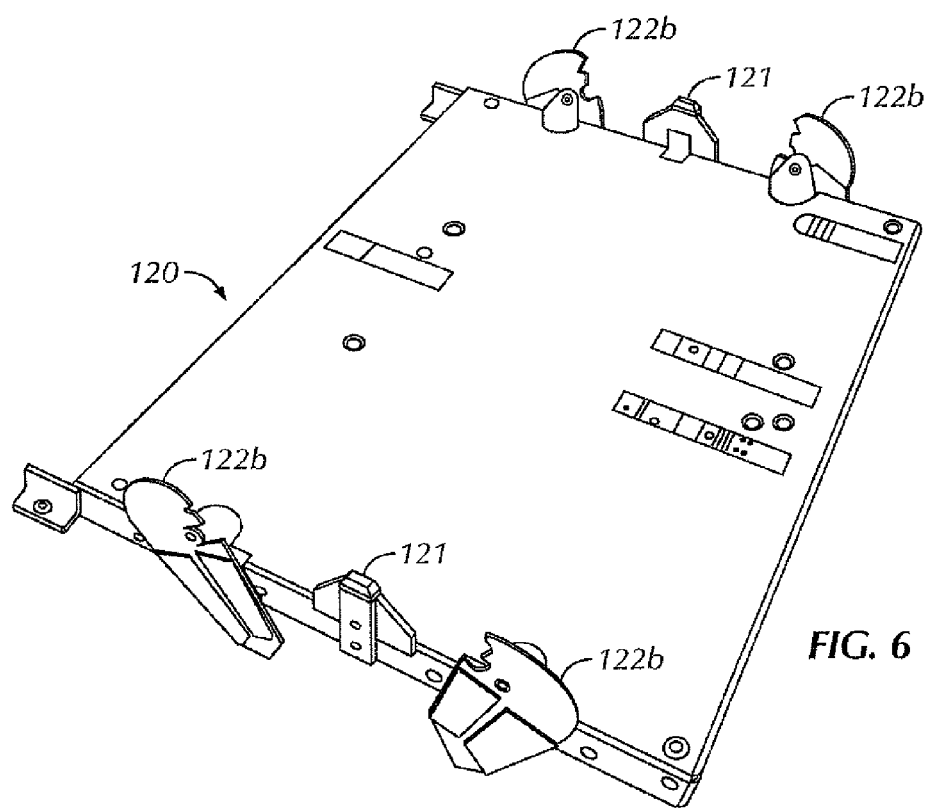
FIG. 6 shows a side perspective view of a bottom surface of the mezzanine tray of FIG. 4.

FIGS. 4-6 show a removable mezzanine tray 120 (hereinafter referred to as tray 120) according to one or more embodiments of the present invention. The tray 120 is configured to mount the mounting brackets 110 disposed within a computer chassis. The tray 120 includes insertion alignment members 121 and a clamping mechanism. The insertion alignment members 121 may be attached to opposing side walls of the tray 120. The clamping mechanism is configured to clamp the mounted tray 120 against the mounting brackets 110, so as to lock the tray 120 in place.

In one or more embodiments, the clamping mechanism may be a pair of rotatable clamping levers 122. As can be seen in FIG. 4, each of the rotatable clamping levers 122 may include cam portions 122b attached to opposing side walls of the tray 120 and a handle portion connecting the cam portions 122b. The rotatable clamping levers 122 are configured to rotate about the cam portions 122b, and are rotatable between an open position and a closed position. FIG. 4 shows the tray 120 in which both of the clamping levers 122 are in an open position, and FIG. 5 shows the tray 120 in which one of the rotatable clamping levers 122 has been rotated to a closed position.

In one or more embodiments, the insertion alignment members 121 may be attached to opposing side walls of the tray 120 between the cam portions 122b. These insertion alignment members 121 ensure that the tray 120 is properly aligned with the mounting brackets 110 upon insertion and, accordingly, ensures that the mezzanine board connectors will align with the base PCB connectors correctly.

The mezzanine board mounting assembly 100 functions in multiple stages. In one or more embodiments, the mezzanine board mounting assembly 100 operates in two stages: the inserting stage and the securing stage.

In the inserting stage, the tray 120 is mounted on the mounting brackets 110. The tray 120 holds the mezzanine board to be connected to the main PCB. The handle portions 122a may be used to carry the tray 120 and lower it onto the mounting brackets 110 such that the insertion alignment members 121 slide along the engaging portions 112 of the mounting brackets 110. As shown in FIG. 2, a guide rail may be formed on each of the mounting brackets 110 to guide the insertion alignment members 121 into the engaging portions 112. The insertion alignment members 121 may be of various shapes and forms, e.g., flat trapezoidal shape, that allow for a low-friction sliding interaction with the engaging portions 112. The tray 120 is lowered until the insertion alignment members 121 have fully engaged with the engaging portions 112 and the tray 120 is completely mounted on a mounting surface, e.g., mounting surfaces 115, of the mounting brackets 110.

Figure 7:
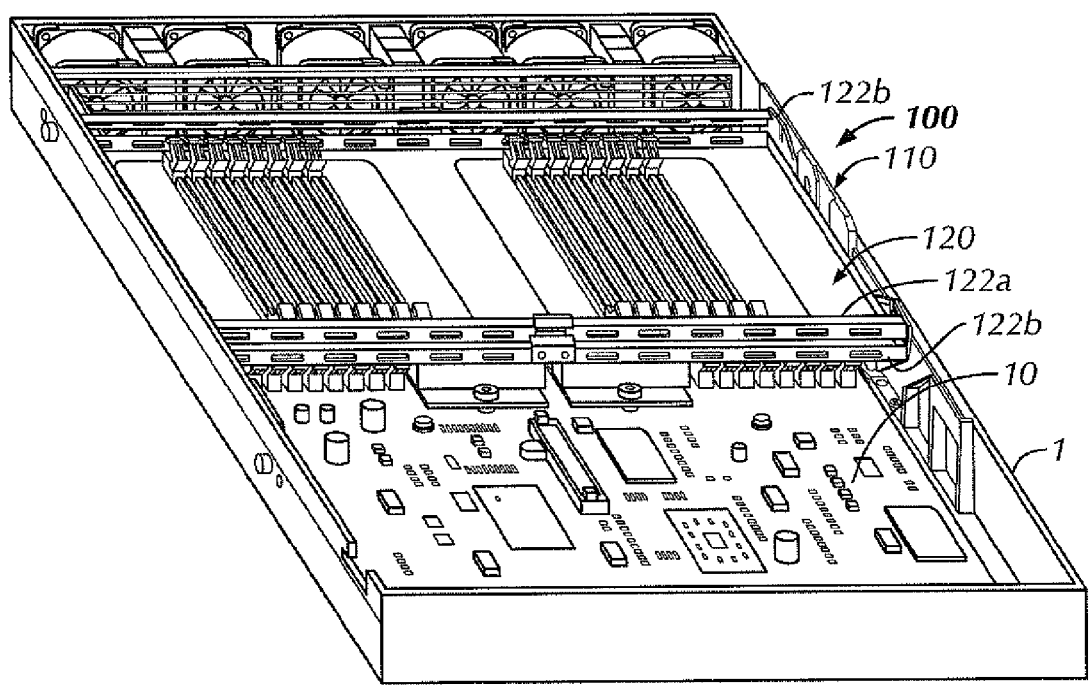
FIG. 7 shows a view of a mezzanine tray secured in a computer chassis.

In the securing stage, the rotatable clamping levers 122 of the tray 120 (now mounted on the mounting brackets 110) are rotated to a closed position as shown in FIG. 7. As the rotatable clamping levers 122 rotate, the cam portions 122b clamp the elastomer inserts 150 against the clamping portions 113 of the mounting brackets 110. Once the levers 122 have fully rotated to the closed position, the tray 120 is securely locked in place by the retention forces created by the compression of the elastomer inserts 150. The clamping effect creates the retention forces without altering the alignment location of the mezzanine mounting assembly 100.

The tray 120 can be unlocked and removed by rotating the levers 122 to an open position, whereby the elastomer inserts 150 are released by the cam portions 122b, and then lifting the tray 120 off the mounting brackets 110.

Advantages of the present invention, in accordance with one or more embodiments, may include one or more of the following. The multi-stage insertion and securing mechanisms provide tool-less installation and removal of mezzanine mounting assemblies, and effectively retain heavy mezzanine assemblies while ensuring that precise alignment requirements are met for high-density interconnects.

During the inserting stage, the handle portions 122a allow for easy and safe handling of the tray 120. The alignment of the mezzanine mounting assembly is driven by the connectors and associated alignment features, and the configuration of the engaging portions 112 and the insertion alignment members 121 allow for uniform installation of the mezzanine mounting assembly 100, even with offset asymmetrical placement of high-density connectors. Further, the configuration of the engaging portions 112 and the insertion alignment members 121 enables the tray 120 to have a low-friction sliding interaction with the mounting brackets 110 during mounting, thereby reducing the insertion force necessary to install the tray 120 onto the mounting brackets 110. As a result, smooth insertion of the mezzanine board is made possible.

During the securing stage, the clamping effect created by the interaction between the cam portions 122b and the integrated elastomer inserts 150 ensures that the mezzanine mounting assembly is held securely in place once the rotatable clamping levers 122 are fully engaged, i.e., fully rotated to the closed position. Due to the multi-stage architecture, the retention forces created by the compression of the clamped elastomer inserts 150 can be applied only after all the alignment requirements have been met, and the clamping effect does not alter the alignment location of the mezzanine mounting assembly 100.

The elastic nature of the elastomer inserts 150 provides effective clamping and prevents over-compression. Once clamped in place, any forces exerted on the mezzanine mounting assembly 100 due to, e.g., shock or vibration, are directed to the computer chassis 1, thus preventing interconnect components from carrying loads of the exerted force. As a result, any pre-loaded force or stress on the system interconnects can be prevented.

According to one or more embodiments of the multi-stage mezzanine mounting assembly as described above, robustness and precision can both be achieved. The multi-stage architecture also provides ease of assembly, as the automatic aligning and clamping features eliminate the need for additional user attention or special precision tools. This allows a user to repeatedly install or uninstall heavy mezzanine assemblies with ease. Further, because the retention features of the securing mechanism is independent of the alignment features of the insertion mechanism, the mezzanine mounting assembly can be aligned with more precision and secured with greater retention force.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A multi-stage mezzanine board mounting assembly within a computer chassis, comprising:
   a mezzanine tray comprising a clamping mechanism; and
   mezzanine mounting brackets disposed within the computer chassis and configured to engage with the mezzanine tray when the mezzanine tray is mounted thereon,
   wherein the clamping mechanism is configured to clamp the mezzanine tray against the mezzanine mounting brackets such that the mezzanine tray is locked in place on the mezzanine mounting brackets,
   wherein the mezzanine tray comprises insertion alignment members, and
   wherein each of the mezzanine mounting brackets comprises:
      an engaging portion configured to engage with the insertion alignment members; and
      a clamping portion configured to be clamped by the clamping mechanism,
   wherein the mezzanine mounting brackets further comprise elastomer inserts disposed at an interface between the clamping mechanism of the mezzanine tray and the clamping portions of the mezzanine mounting brackets, and
   wherein the clamping mechanism of the mezzanine tray is configured to clamp the elastomer inserts against the clamping portions, such that the mezzanine tray is locked in place on the mezzanine mounting brackets when the clamping mechanism is fully engaged.

2. The multi-stage mezzanine board mounting assembly according to claim 1, wherein the clamping mechanism of the mezzanine tray comprises a pair of rotatable clamping levers.

3. The multi-stage mezzanine board mounting assembly according to claim 2, wherein each of the rotatable clamping levers comprises:
   cam portions attached to opposing side walls of the mezzanine tray; and
   a handle portion connecting the cam portions.

4. The multi-stage mezzanine board mounting assembly according to claim 3, wherein the insertion alignment members of the mezzanine tray are disposed on the opposing side walls of the mezzanine tray between the cam portions of the rotatable clamping levers.

5. The multi-stage mezzanine board mounting assembly according to claim 4, wherein the cam portions of the rotatable clamping levers are configured to clamp the elastomer inserts against the clamping portions of the mezzanine mounting brackets, such that the mezzanine tray is locked in place on the mezzanine mounting brackets when the rotatable clamping levers are fully engaged.

6. The multi-stage mezzanine board mounting assembly according to claim 1, wherein
   a guide rail is formed on the engaging portion of the mezzanine mounting brackets to guide the insertion alignment members.

7. The multi-stage mezzanine board mounting assembly according to claim 1, wherein the insertion alignment members have a substantially flat trapezoidal shape.

8. The multi-stage mezzanine board mounting assembly according to claim 1, wherein the mezzanine mounting brackets are installed on side walls of the computer server chassis.

9. A multi-stage mezzanine board mounting assembly within a computer chassis, comprising:
   a mezzanine tray comprising:
      a pair of rotatable clamping levers, each comprising cam portions attached to opposing side walls of the mezzanine tray and a handle portion connecting the cam portions; and
      an insertion alignment member disposed on each of the opposing side walls of the mezzanine tray between the cam portions of the rotatable clamping levers; and
   mezzanine mounting brackets disposed within the computer chassis, comprising:
      engaging portions configured to engage with the insertion alignment members when the mezzanine tray is mounted thereon;
      clamping portions configured to be clamped by the cam portions of the mezzanine tray; and
      elastomer inserts disposed at an interface between the clamping portions of the mezzanine mounting brackets and the cam portions of the rotatable clamping levers,
   wherein the cam portions of the rotatable clamping levers are configured to clamp the elastomer inserts against the clamping portions of the mezzanine mounting brackets such that the mezzanine tray is locked in place on the mezzanine mounting brackets when the rotatable clamping levers are fully engaged.

10. The multi-stage mezzanine board mounting assembly according to claim 9, wherein
    guide rails formed on the engaging portions of the mezzanine mounting brackets to guide the insertion alignment members.

11. The multi-stage mezzanine board mounting assembly according to claim 9, wherein the insertion alignment members have a substantially flat trapezoidal shape.

12. The multi-stage mezzanine board mounting assembly according to claim 9, wherein the mezzanine mounting brackets are installed on side walls of the computer server chassis.

13. A method of installing a mezzanine board onto a base circuit board within a computer chassis, the method comprising:
    disposing mezzanine mounting brackets within the computer chassis;
    mounting a mezzanine tray onto the mezzanine mounting brackets such that insertion alignment members of the mezzanine tray engage with an engaging portion of the mezzanine mounting brackets;
    rotating rotatable clamping levers such that the mezzanine tray is locked in place on the mezzanine mounting brackets when the rotatable clamping levers are fully engaged; and
    disposing elastomer inserts in the mezzanine mounting brackets such that the elastomer inserts get clamped against the clamping portions of the mezzanine mounting brackets such that the mezzanine tray is locked in place on the mezzanine mounting brackets when the rotatable clamping levers are fully engaged.

* * * * *